United States Patent
Roeth et al.

(10) Patent No.: US 7,152,896 B2
(45) Date of Patent: Dec. 26, 2006

(54) LIGHT-WEIGHT COMPONENT, ESPECIALLY BODY PART

(75) Inventors: Thilo Roeth, Aachen (DE); Reinhard Vomhof, Bad Laasphe (DE)

(73) Assignee: Imperia GmbH, Aachen (DE)

( * ) Notice: Subject to any disclaimer, the term of this patent is extended or adjusted under 35 U.S.C. 154(b) by 201 days.

(21) Appl. No.: 10/820,211

(22) Filed: Apr. 7, 2004

(65) Prior Publication Data

US 2004/0222665 A1   Nov. 11, 2004

(51) Int. Cl.
*B60J 7/00* (2006.01)

(52) U.S. Cl. .................. 296/30; 296/203.01

(58) Field of Classification Search .............. 296/29, 296/30, 203.01, 203.03, 187.12, 209
See application file for complete search history.

(56) References Cited

U.S. PATENT DOCUMENTS

| 5,190,803 | A | 3/1993 | Goldbach et al. |
| 5,411,308 | A | 5/1995 | Kreis et al. |
| 5,755,486 | A | 5/1998 | Wycech |
| 5,819,587 | A | 10/1998 | Leber et al. |
| 6,296,299 | B1* | 10/2001 | Hanakawa et al. .... 296/187.03 |
| 6,327,827 | B1 | 12/2001 | Flegel et al. |
| 6,503,585 | B1 | 1/2003 | Wagenblast et al. |
| 2001/0020797 | A1* | 9/2001 | Saeki ................. 296/203.03 |
| 2002/0092372 | A1 | 7/2002 | Bowen |

FOREIGN PATENT DOCUMENTS

| DE | 41 03 036 A1 | 8/1992 |
| DE | 195 08 970 A | 2/1996 |
| DE | 195 23 112 A | 6/1996 |
| EP | 0 207 910 B1 | 1/1987 |
| EP | 0 370 342 B1 | 8/1993 |
| EP | 0 995 668 A | 4/2000 |
| EP | 1 138 581 A | 10/2001 |
| JP | 03-048060 | 3/1991 |

* cited by examiner

*Primary Examiner*—Joseph D. Pape
(74) *Attorney, Agent, or Firm*—Alexander R. Schlee

(57) ABSTRACT

The present invention relates to a lightweight part, particularly a vehicle body part, which includes sheet steel and light metal. In order to improve the manufacturability as well as the strength and rigidity properties, the sheet steel (6 through 8) is implemented as thin-walled, particularly has a thickness of less than 2 mm, and has at least one free area which is provided locally with a cast or sintered reinforcement structure (15) made of light metal.

18 Claims, 1 Drawing Sheet

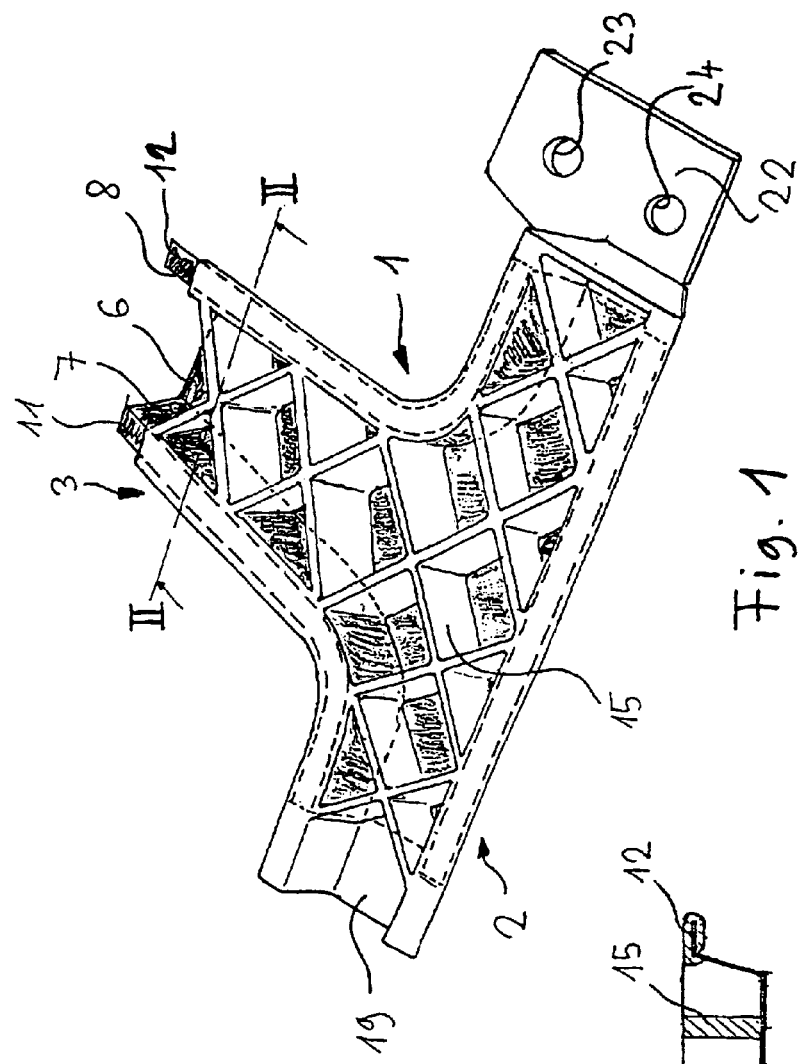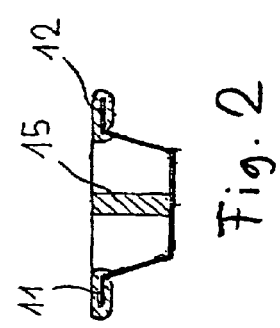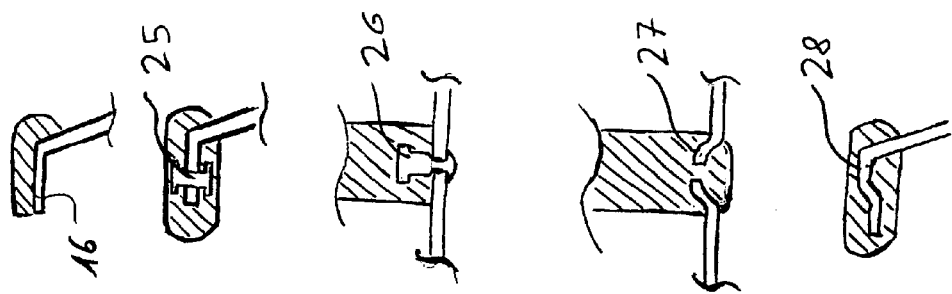

LIGHT-WEIGHT COMPONENT, ESPECIALLY BODY PART

This patent application is based on the International Patent Application PCT/DE02/03978 claiming priority of the German patent application DE 10153712.3.

BACKGROUND OF THE INVENTION

The present invention relates to a lightweight part, particularly a vehicle body part, which includes sheet steel and light metal.

A cast vehicle construction part made of a light metal alloy having a sheet steel structure that is cast on or cast in is known from German Unexamined Application DE 41 03 036 A1. The sheet steel structure either forms the vehicle outer skin or a flange for connection to a further vehicle part. In the known vehicle construction part, the sheet steel structure is connected to the light metal alloy over its entire surface. It is possible to provide targeted cavities in the vehicle construction part. DE 41 03 036 A1 teaches reinforcing such cavities through the cast-in sheet steel structure. Casting in the sheet steel structure has been shown to be difficult in practice.

A lightweight part made of a shell-shaped main body, whose inner space has reinforcement ribs, is known from European Patent Specification EP 0 370 342 B1. The reinforcement ribs are made of molded-in plastic and are connected to the main body at discrete connection points via openings. The plastic extends through the openings into the main body and beyond the areas of the openings. Structural limits are placed on the performance of the plastic (especially taking the temperature dependence into consideration) through the selection of the material combination. In the event of extreme loads, plastic tends to crumble.

SUMMARY OF THE INVENTION

Some of many objects of the present invention are therefore to provide a lightweight part which is simpler to produce, having a high structural performance over a wide field of use, particularly even at high temperatures.

These and other objects are achieved by a lightweight part having the features of claim 1. In contrast to the lightweight part known from DE 41 03 036 A1, according to the present invention the thin-walled sheet steel is not connected over its entire area to the light metal, but rather only locally to a reinforcement structure made of light metal. In this case, "locally" means that the sheet steel is only reinforced where high loads typically occur in the installed state of the lightweight part due to local buckling. The term "reinforcement structure" is to express the idea that even in a reinforced region of the sheet steel, free areas are still present. The reinforcement structure may be implemented as ribbed or honeycombed, for example, and, in contrast to the application of the light metal over the entire surface of the sheet steel known from DE 41 03 036 A1, leads to a significant savings in material and therefore to a lower weight of the lightweight part. The use of light metal as the reinforcement structure provides significantly better strength and rigidity properties than the plastic ribs known from EP 0 370 342 B1. In addition, it has surprisingly been shown in the framework of the present invention that if light metal is used as the reinforcement structure, openings in the sheet steel, which are complex to manufacture and visually conspicuous, can be omitted.

A preferred exemplary embodiment of the lightweight part is distinguished in that the reinforcement structure includes at least one local thickening which is positioned at a strongly loaded point of the sheet steel. Through such a thickening, which is ribbed, for example, buckling of the sheet steel under load may be avoided. The fact that the thickening does not extend over the entire surface of the sheet steel, but rather is locally limited, has a positive effect on the weight of the lightweight component without impairing its strength or rigidity.

A further preferred exemplary embodiment of the lightweight part is distinguished in that the reinforcement structure includes multiple ribs which are positioned essentially perpendicularly to the sheet steel. This rib shape has been shown to be especially advantageous during investigations performed in the framework of the present invention, both in regard to the stability and from the viewpoint of manufacturing technology.

A further preferred exemplary embodiment of the lightweight part is distinguished in that the ribs are connected to one another in crosses. The crossed arrangement of the ribs allows them to absorb forces from different directions.

A further preferred exemplary embodiment of the lightweight part is distinguished in that the reinforcement structure is cast onto the sheet steel or cast into the sheet steel on only one side. In this way, it is ensured that the other side of the sheet steel is not visually impaired by the reinforcement structure. In particular, no openings are provided in the sheet steel.

A further preferred exemplary embodiment of the lightweight part is distinguished in that the reinforcement structure is connected to the sheet steel in a form-fitting way. Through the form fit, an especially stable connection between the sheet steel and the reinforcement structure is ensured.

A further preferred exemplary embodiment of the lightweight part is distinguished in that the sheet steel is implemented as an oblong profiled beam having an open, particularly U-shaped cross-section having a base from which two legs originate. The open, particularly U-shaped cross-section is used to receive the reinforcement structure inside the beam. The beam has a continuous surface without openings or interruptions to the outside.

A further preferred exemplary embodiment of the lightweight part is distinguished in that both the base and the two legs of the beam are connected to the reinforcement structure. In this way, an especially stable connection between the reinforcement structure and the sheet steel is ensured. The connection between the sheet steel and the reinforcement structure is provided by casting the reinforcement structure onto the sheet steel.

A further preferred exemplary embodiment of the lightweight part is distinguished in that flanges, onto which the reinforcement structure is cast, originate from the two legs. In this way, detachment of the reinforcement structure from the two legs in the loaded state of the beam is reliably prevented. The flanges may also be cast completely into the reinforcement structure.

A further preferred exemplary embodiment of the lightweight part is distinguished in that the reinforcement structure is attached to the two flanges with the aid of attachment means. Through the additional attachment means, the stability of the connection between the flanges and the reinforcement structure may be increased even further. The attachment means may be rivets which are placed in the sheet steel before the casting and enclosed by the reinforcement structure. Instead of the rivets, bolts which are welded onto the sheet steel may also be used.

A further preferred exemplary embodiment of the lightweight part is distinguished in that the reinforcement structure is attached to the base of the beam with the aid of attachment means, such as rivets or bolts. Through the additional attachment means on the base of the beam, the stability of the connection between the sheet steel and the reinforcement structure may be increased even further.

A further preferred exemplary embodiment of the lightweight part is distinguished in that the reinforcement structure is held in protrusions and/or depressions, particularly beads, which are implemented in the sheet steel. In this way, an especially stable mechanical anchoring of the reinforcement on the sheet steel, which is also simple to produce, is ensured.

A further preferred exemplary embodiment of the lightweight part is distinguished in that the oblong beam is implemented as T-shaped in a top view on at least one end. The T-shaped end of the beam provides three attachment points for further parts.

A further preferred exemplary embodiment of the lightweight part is distinguished in that the sheet steel has a thickness of less than 1 mm. During the investigations performed in the framework of the present invention, it has been shown that the reinforcement structure made of light metal provides sufficient strength and rigidity even at a sheet steel thickness below 1 mm.

Further advantages, features, and characteristics of the present invention result from the following description, in which different exemplary embodiments are described in detail with reference to the drawing.

BRIEF DESCRIPTION OF THE DRAWINGS

FIG. 1 shows a perspective illustration of a T-shaped lightweight part according to a first embodiment of the present invention, and FIG. 2 shows the view of the section along line II—II in FIG. 1.

FIG. 3 shows sectional views through various attachment means connecting the metal sheet to the reinforcement structure.

DETAILED DESCRIPTION OF THE DRAWINGS

In FIG. 1, a junction point from the B-pillar of a motor vehicle is shown. An oblong beam 2 is connected in a T-shape to a further oblong beam 3 in the junction point 1. The beams 2 and 3 are connected to one another in one piece and have a U-shaped cross-section having a base 6 from which two legs 7 and 8 originate. Brackets 11 and 12 are angled onto the free ends of the legs 7 and 8. The base 6, the legs 7 and 8, and the flanges 11 and 12 are produced in one piece from sheet steel.

A crossed rib structure 15 made of light metal, which is positioned perpendicularly to the base 6 made of sheet steel, is embedded between the legs 7 and 8. In the sectional view shown in FIG. 2, it may be seen that the flanges 11 and 12 are cast into the reinforcement structure made of light metal. The sheet steel is shown dashed in FIG. 1 at points where it would not be visible.

The two ends of the beam 2 are implemented differently. The end 19 of the beam 2, positioned on the left in FIG. 1, is produced completely from light metal as a light metal profile, without sheet steel. Other extrusion profiles made of light metal may be attached to an end 19 implemented in this way.

The right end 22 of the beam 2 in FIG. 1 is implemented as a flange cast from light metal having two through holes 23 and 24 to receive attachment elements. Further parts may be attached to the flange.

One end of the beam 3 passes into the beam 2 positioned perpendicularly thereto. On the free end of the beam 3, the U-shaped sheet steel profile projects out of the light metal structure. The sheet steel has a thickness of approximately 1 mm. Further profiles made of sheet metal may be attached to the pure sheet steel, through welding, for example.

In the lightweight part according to the present invention, the light metal is used to stabilize the thin-walled sheet steel. Due to the local reinforcement of the sheet steel with light metal, significantly lower sheet steel thicknesses may be used than in typical lightweight parts. It is only reinforced where necessary because of the loads arising in operation.

As shown in FIG. 3, for connecting the reinforcement structure to the sheet steel, a variety of connections are possible, for instance attachments as shown in details 25 and 26, protrusions as shown in detail 27, or beads as shown in detail 28.

What is claimed is:

1. A lightweight vehicle body part including
   an oblong profiled beam made of sheet steel, and
   a light metal,
   wherein
   the beam has an open cross-section with a base and two legs extending from said base; and
   the beam has at least one free area which is locally provided with a cast or sintered reinforcement structure made of the light metal.

2. The lightweight part according to claim 1, wherein the reinforcement structure includes at least one local thickening which is positioned at a strongly loaded point of the sheet steel.

3. The lightweight part according to claim 1, wherein the reinforcement structure includes multiple ribs which are positioned essentially perpendicularly to the sheet steel.

4. The lightweight part according to claim 3, wherein the ribs are connected to one another in crosses.

5. The lightweight part according to claim 1, wherein the reinforcement structure is cast onto the sheet steel or is cast into the sheet steel on only one side.

6. The lightweight part according to claim 1, wherein the reinforcement structure is connected to the sheet steel in a form-fitting way.

7. The lightweight part according to claim 1, wherein both the base and the two legs of the beam are connected to the reinforcement structure.

8. The lightweight part according to claim 6, wherein flanges, onto which the reinforcement structure is cast, extend from the two legs.

9. The lightweight part according to claim 7, wherein flanges, onto which the reinforcement structure is cast, extend from the two legs.

10. The lightweight part according to claim 8, wherein the reinforcement structure is attached to the two flanges with the aid of attachment means.

11. The lightweight part according to claim 9, wherein the reinforcement structure is attached to the two flanges with the aid of attachment means.

12. The lightweight part according to claim 8, wherein the reinforcement structure is attached to the base of the beam with the aid of attachment means.

13. The lightweight part according to claim 9, wherein the reinforcement structure is attached to the base of the beam with the aid of attachment means.

14. The lightweight part according to claim 1, wherein the reinforcement structure is held on the sheet steel through protrusions and/or depressions, implemented in the sheet steel.

15. The lightweight part of claim 14, wherein the protrusions are beads.

16. The lightweight part according to claim 7, wherein the beam has a T-shaped cross section at at least one end of said beam.

17. The lightweight part according to claim 1, wherein the sheet steel has a thickness of less than 2 mm in at least some regions.

18. The lightweight part according to claim 1, wherein the sheet steel has a thickness of less than 1 mm in at least some regions.

\* \* \* \* \*